(12) United States Patent
Nevermann

(10) Patent No.: US 7,511,513 B2
(45) Date of Patent: Mar. 31, 2009

(54) SYSTEM AND METHOD FOR DETECTING THE PROXIMITY OF A BODY

(75) Inventor: Peter Nevermann, San Diego, CA (US)

(73) Assignee: Siemens Communications Inc., Boca Raton, FL (US)

( * ) Notice: Subject to any disclaimer, the term of this patent is extended or adjusted under 35 U.S.C. 154(b) by 41 days.

(21) Appl. No.: 11/356,595

(22) Filed: Feb. 16, 2006

(65) Prior Publication Data

US 2006/0139034 A1 Jun. 29, 2006

Related U.S. Application Data

(62) Division of application No. 09/968,346, filed on Sep. 28, 2001, now Pat. No. 7,053,629.

(51) Int. Cl.
*G01R 27/32* (2006.01)
*H04B 17/00* (2006.01)

(52) U.S. Cl. ........................... 324/644; 455/117

(58) Field of Classification Search ................ None
See application file for complete search history.

(56) References Cited

U.S. PATENT DOCUMENTS

| | | | |
|---|---|---|---|
| 4,028,662 A | 6/1977 | Young | |
| 4,384,819 A | 5/1983 | Baker | |
| 5,335,366 A | 8/1994 | Daniels | |
| 5,337,353 A * | 8/1994 | Boie et al. | 379/433.01 |
| 5,367,309 A | 11/1994 | Tashjian | |
| 5,440,290 A | 8/1995 | McCullough et al. | |
| 5,459,405 A | 10/1995 | Wolff et al. | |
| 5,524,275 A | 6/1996 | Lindell | |
| 5,613,221 A | 3/1997 | Hunt | |
| 5,668,070 A | 9/1997 | Hong et al. | |
| 5,726,383 A | 3/1998 | Geller et al. | |
| 5,805,067 A | 9/1998 | Bradley et al. | |
| 5,862,458 A | 1/1999 | Ishil | |
| 5,864,316 A | 1/1999 | Bradley et al. | |
| 5,956,626 A | 9/1999 | Kaschke et al. | |
| 6,018,646 A | 1/2000 | Myllymaki et al. | |
| 6,195,532 B1 | 2/2001 | Bamburak | |

(Continued)

FOREIGN PATENT DOCUMENTS

DE 199 07 431 A1 8/2000

(Continued)

OTHER PUBLICATIONS

How Cell Phones Work; http://electronics.howstuffworks.com/cell-phone 4.htm, date unavailable.

(Continued)

*Primary Examiner*—Ernest F Karlsen

(57) ABSTRACT

A system and method for sensing the proximity of an electronic device, in particular, a radio frequency mobile communication device such as a mobile telephone, wireless modem equipped portable computer, or the like to a body employs an antenna capable of altering its impedance for changing the amount of radio frequency electromagnetic energy reflected by the antenna when the antenna is in proximity to the body. The radio frequency electromagnetic energy reflected by the antenna is measured and used for determining proximity of the antenna to the body.

10 Claims, 4 Drawing Sheets

U.S. PATENT DOCUMENTS

| | | | |
|---|---|---|---|
| 6,195,562 | B1 | 2/2001 | Pirhonen et al. |
| 6,529,088 | B2 | 3/2003 | Lafleur |
| 6,633,766 | B1 | 10/2003 | Van der Pol |
| 6,678,532 | B1 | 1/2004 | Mizoguchi |
| 7,146,139 | B2 | 12/2006 | Nevermann |

FOREIGN PATENT DOCUMENTS

| | | |
|---|---|---|
| DE | 199 07 572 A1 | 9/2000 |
| EP | 1 156 591 A1 | 11/2001 |
| WO | WO 95/03549 | 2/1995 |

OTHER PUBLICATIONS

Field Regions; http://www.giangrandi.ch/jack/anttool/regions-e.html, date unavailable.

"Wave Buster Makes Your Mobile Safer!"; http://www.wavebuster.com; Sep. 17, 2001.

"SAR Shield Inc."; http://www.sarshield.com; Sep. 17, 2001.

* cited by examiner

SYSTEM AND METHOD FOR DETECTING THE PROXIMITY OF A BODY

CROSS-REFERENCE TO RELATED APPLICATIONS

This application is a divisional of and claims the benefit of priority from a U.S. patent application Ser. No. 09/968,346, filed Sep. 28, 2001, now U.S. Pat. No. 7,053,629, entitled SYSTEM AND METHOD FOR DETECTING THE PROXIMITY OF A BODY.

BACKGROUND OF THE INVENTION

The present invention relates generally to electronic devices, in particular, radio frequency mobile communication devices such as mobile telephones, wireless modem equipped portable computers, and the like, and more specifically to a system and method for detecting the proximity of such devices to the human body.

Mobile communication devices in common use today employ a radio transceiver (a combination of transmitter and receiver) for communication of voice and data information. Often, it is desirable to control an aspect of the operation of such devices in a particular way depending on whether the device is in close proximity to the user or another person. For example, it is known that exposure to very high levels of radio frequency electromagnetic energy, particularly at microwave frequencies, can heat biological tissue causing harm by increasing body temperature, disrupting behavior, and damaging biological tissue. Consequently, the effect of low levels of radio frequency energy, such as produced by mobile telephones and the like, on human tissue has also come under intense scientific investigation. While there is no scientific proof that the relatively low levels of radio frequency energy produced by such devices can cause damage to human tissue, many governmental agencies, such as the United States Federal Communication Commission (FCC) and many European regulatory organizations, have nevertheless imposed precautionary regulations and measurement guidelines aimed at limiting the exposure of users to radio frequency energy. Accordingly, it may be desirable to detect when a mobile telephone is in proximity to the body of a user or other person in order to prevent the telephone from operating in modes where higher power levels are used when the telephone is close to a human body. In this manner, unnecessary exposure of the user or other persons to radio frequency radiation may be prevented. Similarly, the earpiece speaker of many mobile telephones are used to provide a "ringer" for alerting the user when an incoming call is received. In such cases, the ringer may be set to a high volume making the ring more easily heard, for example, in areas of high noise. However, if an incoming call is received while the telephone is placed to the user's head so that the earpiece rests against the user's ear, the user may experience discomfort, or even injury due to acoustic shock caused by the ringer's higher volume. In such cases, it would be desirable to detect when the mobile telephone is placed against the user's head so that the volume of the ringer may be lowered accordingly.

Consequently, it becomes necessary to detect, in a reliable manner, when the mobile communication device is in proximity to the body of the user or other person so that operation of the device may be controlled accordingly. Thus, it is desirable to provide a system and method for reliably detecting whether an electronic device, in particular, a radio frequency mobile communication device such as a mobile telephone, wireless modem equipped portable computer, or the like is in proximity to a human body, animal body, or the like.

SUMMARY OF THE INVENTION

The present invention is directed to a system and method for sensing the proximity of an electronic device, in particular, a radio frequency mobile communication device such as a mobile telephone, wireless modem equipped portable computer, or the like to a body.

According to a specific embodiment, the present invention provides a system for detecting the proximity of a body. The system includes a sensor for sensing radio frequency electromagnetic energy within a predetermined frequency band, an antenna capable of having its impedance altered for changing the amount of radio frequency electromagnetic energy reflected when the antenna is in proximity to the body, and a coupler for directing at least a part of the radio frequency electromagnetic energy reflected by the antenna to the sensor. The sensor senses radio frequency electromagnetic energy reflected by the antenna for determining the proximity of the antenna to the body.

According to another specific embodiment, the present invention provides a method for detecting the proximity of a body using an antenna capable of having its impedance altered for changing the amount of radio frequency electromagnetic energy reflected by the antenna when the antenna is in proximity to the body. The method includes steps of sampling radio frequency electromagnetic energy reflected by the antenna within a predetermined frequency band, measuring the sampled radio frequency electromagnetic energy, and determining proximity of the antenna to the body based on the amount of radio frequency electromagnetic energy measured.

According to another specific embodiment, the invention provides an electronic device. The device includes an antenna capable of having its impedance altered for changing the amount of radio frequency electromagnetic energy reflected when the antenna is in proximity to the body, and a sensor for sensing radio frequency electromagnetic energy within a predetermined frequency band. The device also includes a coupler for directing at least a part of the radio frequency electromagnetic energy reflected by the antenna to the sensor, and a controller for determining proximity of the antenna to the body based on the radio frequency electromagnetic energy sensed by the sensor. The radio frequency electromagnetic energy reflected by the antenna is measured for determining the proximity of the antenna to the body.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

In a first aspect of the invention, a system for detecting the proximity of a body is disclosed. The system employs an antenna capable of altering its impedance for changing the amount of radio frequency electromagnetic energy reflected when the antenna is in proximity to the body. A coupler directs at least a part of the radio frequency electromagnetic energy reflected by the antenna to a sensor which senses radio frequency electromagnetic energy reflected by the antenna within a predetermined frequency band for determining the proximity of the antenna to the body. In exemplary embodiments, a controller determines proximity of the antenna to the body based on the radio frequency electromagnetic energy sensed by the sensor. The controller may then control a function of an electronic device employing the system when the antenna is determined to be in proximity to the body.

In a second aspect of the invention, a method is provided for detecting the proximity of a body using an antenna capable of altering its impedance for changing the amount of radio frequency electromagnetic energy reflected by the antenna when the antenna is in proximity to the body. In exemplary embodiments, the method includes the steps of sampling radio frequency electromagnetic energy reflected by the antenna within a predetermined frequency band, measuring the sampled radio frequency electromagnetic energy, and determining proximity of the antenna to the body based on the amount of radio frequency electromagnetic energy measured. A function of an electronic device employing the method may then be controlled accordingly when the antenna is determined to be in proximity to the body.

Reference will now be made in detail to the presently preferred embodiments of the invention, examples of which are illustrated in the accompanying drawings.

Figure 1:
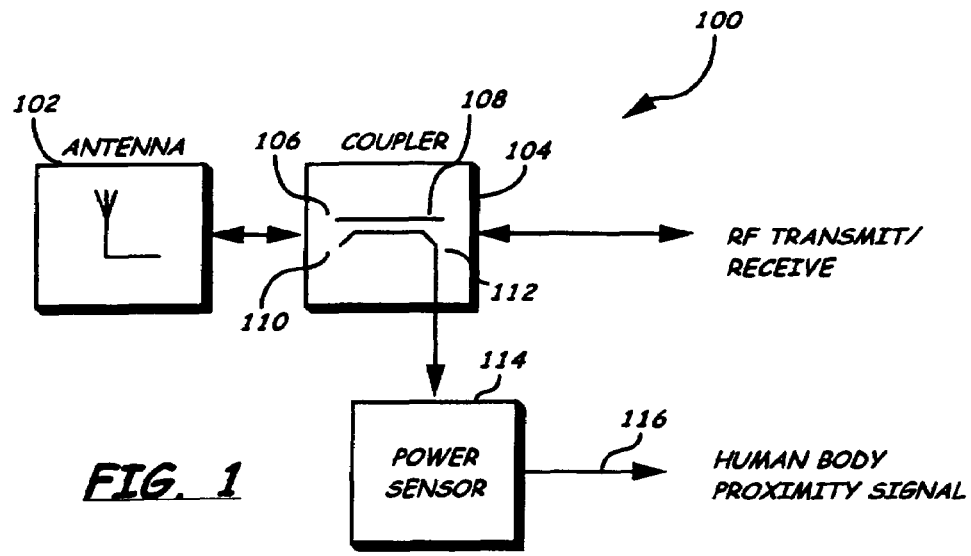
FIG. 1 is a block diagram illustrating a system for sensing the proximity of a body in accordance with an exemplary embodiment of the present invention.

FIG. 1 illustrates a system 100 for sensing the proximity of a body, in particular, a lossy dielectric body such as a human body, animal body or the like in accordance with an exemplary embodiment of the present invention. The system 100 includes an antenna 102, a directional coupler 104 having multiple radio frequency (RF) ports (a directional coupler 104 having four RF ports 106, 108, 110 & 112 is shown), and at least one detector or power sensor 114. An energy source such as, for example, the power amplifier of a mobile telephone transmitter, is coupled to the antenna for transmitting signals via the antenna. The power amplifier delivers radio frequency electromagnetic energy to the antenna via an antenna feed such as a feed-line (e.g., a cable, wire, coplanar line, etc.), a feed network, or the like (RF TRANSMIT/RECEIVE). The antenna and antenna feed each have a characteristic impedance, or opposition to electrical current. In an ideal situation, the impedances of the antenna and antenna feed match perfectly, and all of the electromagnetic energy sent to the antenna is converted to radio energy and radiated into the atmosphere. However, in less than ideal situations, when the impedances are not perfectly matched, some of the electromagnetic energy sent to the antenna is not converted to radio energy, but is instead reflected back along the antenna feed.

The impedance of the antenna is altered by the presence of conductive bodies (e.g., a human body, an animal body, or the like) within the region in immediate proximity to the antenna. This region, in which a change in geometry of conductive bodies in proximity to the antenna will change the impedance of the antenna and therefore the amount of reflected electromagnetic energy, is referred to in the art as the "reactive near field." The size of the reactive near field, and thus the proximity at which such bodies affect the impedance of the antenna, is related to the wavelength or frequency of the electromagnetic energy by the equation:

$$r \approx 0.62 \sqrt{\frac{d^2}{\lambda}}$$

where $r$ is the radius of the reactive near field, $d$ is the maximum dimension of the antenna, and $\pi$ is the wavelength of the electromagnetic energy. The presence of a medium other than air in the vicinity of the antenna 102 (i.e., within the reactive near field) causes the impedance of the antenna to be altered, and thus changes the amount of energy reflected by the antenna 102. Thus, in accordance with the present invention, the impedance of antenna 102 may be altered so that the amount of radio frequency electromagnetic energy reflected by the antenna 102 within a predetermined frequency band (e.g., a transmit band (Tx) used by an electronic device employing the system) when the antenna 102 is in proximity to the body is changed. Using the directional coupler 104, a part of this reflected energy is made available, at RF port 112, to power sensor 114. Power sensor 114 senses the amount or power of radio frequency electromagnetic energy reflected by the antenna 102 within a predetermined frequency band and generates a signal ("HUMAN BODY PROXIMITY SIGNAL") 116 corresponding to the power of radio frequency energy sensed. This human body proximity signal 116 may then be used for ascertaining the proximity of the antenna 102 (and thus, the proximity of an electronic device to which the antenna 102 is affixed) to the body.

Figure 2:
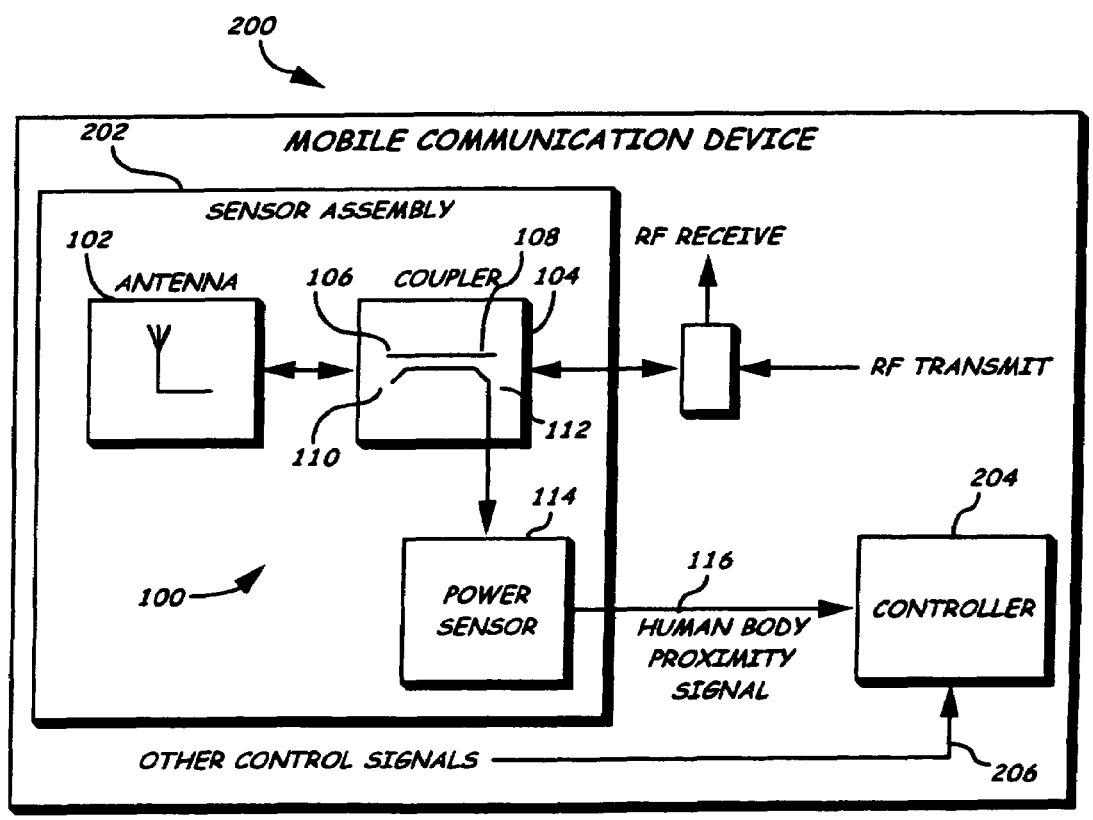
FIG. 2 is a block diagram illustrating an exemplary mobile communication device having a sensor assembly employing the system shown in FIG. 1 for sensing the proximity of the device to a body.

Referring now to FIG. 2, an exemplary electronic device employing the system 100 shown in FIG. 1 for sensing the proximity of the device to a body is described. In exemplary embodiments, the electronic device is characteristic of a radio frequency mobile communication device 200 such as a mobile telephone, a portable computer equipped with a wireless modem, a palmtop computer equipped with a wireless modem, or the like. However, it will be appreciated by those of skill in the art that the present invention may be employed by any device having a radio frequency transceiver or transmitter/receiver assembly.

Mobile communication device 200 includes a sensor assembly 202 employing the system 100 shown in FIG. 1. As discussed in the description of FIG. 1, when used in proximity to a lossy dielectric body such as a human body, an animal body or the like, antenna 102 will change its radio frequency properties in terms of impedance and the amount of energy reflected. Power sensor 114 measures the power of radio frequency electromagnetic energy reflected by the antenna within a predetermined frequency band, for example, the transmit band (Tx) of mobile communication device 200 for determining when the antenna 102, and, consequently, the mobile communication device 200 to which the antenna 102 is affixed, is in proximity to the body.

As shown in FIG. 2, the human body proximity signal 116 produced by sensor assembly 202 is provided to a controller 204. In exemplary embodiments, the controller 204 uses the human body proximity signal 116 to determine whether the antenna 102 of the mobile communication device 200 is in proximity to a body based on the radio frequency electromagnetic energy sensed by the power sensor 114. The controller 204 may then control operation of the mobile communication device 200 accordingly by inhibiting or enabling one or more functions of the device depending on whether or not the antenna 102 is determined to be in proximity to a body. For example, it may be desirable to limit operation of the mobile communication device 200 at higher power levels when the device is close to a human body. In such embodiments, the controller 204 may effect a reduction in power of the mobile communication device 200 or provide a warning that the device is operating at an unsuitable power level when the controller determines that the antenna 102 of the device is in proximity to a body. Similarly, where the mobile communication device 200 comprises a mobile telephone and the earpiece speaker of the telephone is used to provide a ringer, it may be desirable to lower the volume of the ringer when the telephone is placed against the user's head in a "talk" position. Accordingly, the controller may lower the ringer volume to a desired level upon detecting that the telephone is in proximity to a body.

As shown in FIG. 2, control signals 206 other than the human body proximity signal 116 may be used by the controller 104 for controlling operation of the mobile communication device 200. For instance, in the example described, signals providing information about the current traffic mode in which a telephone is operating and the current power level required for maintaining the communication link between the mobile communication device 200 and a base station may be used in addition to the human body present signal 116 for determining if a reduction in the device's power level is necessary.

In embodiments of the invention, antenna 102 is slightly detuned so that it is not perfectly matched to a free space environment. Preferably, antenna 102 is detuned so that less radio frequency energy is reflected within a predetermined frequency band (i.e., the transmit band (Tx) of the mobile communication device 200) when the device is in proximity to a lossy dielectric body such as a part of a human body, or the like. The lack of or reduced power of radio frequency electromagnetic energy reflected by the antenna 102 within the frequency band thus indicates the presence of such a body in proximity to the antenna 102.

Figure 3:
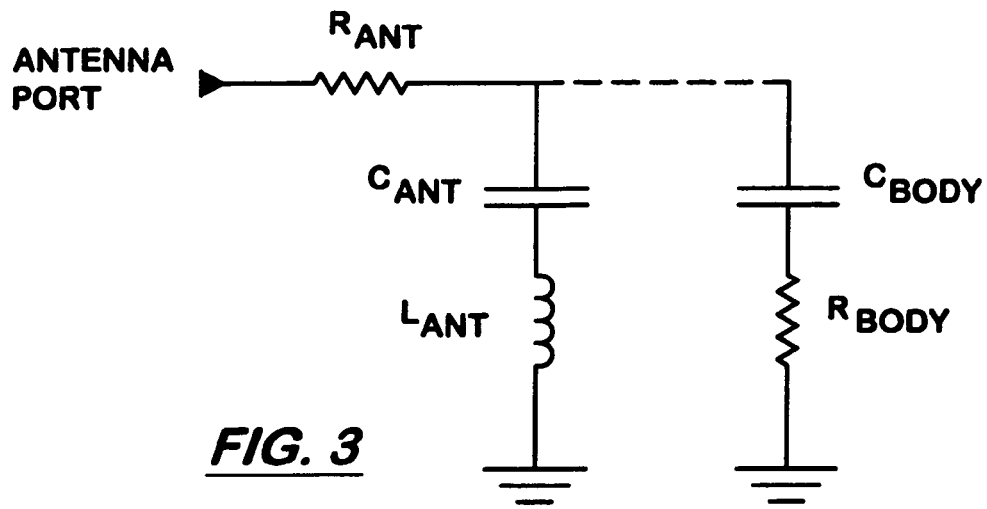
FIG. 3 is a circuit diagram illustrating a small signal equivalent circuit describing a detuned antenna and a human body in close proximity to the mobile communication device.

FIG. 3 illustrates a small signal equivalent circuit describing the antenna 102 of system 100 and a human body in close proximity to the mobile communication device 200 wherein the antenna has been detuned. The equivalent circuit is comprised of a resistor $R_{ANT}$ (radiation), a capacitor $C_{ANT}$ and an inductor $L_{ANT}$ modeling the resonance frequency of the antenna. Typically, the antenna 102 of mobile communication device 200 is designed to reach a real part of its impedance at approximately 50 Ohms in order to match the power amplifier of the device's transceiver. The presence of a part of a human body (e.g., the user's head) may be approximated by an additional lossy capacitance described by capacitor $C_{BODY}$ and resistor $R_{BODY}$. By taking this lossy capacitance into account, the antenna 102 may be detuned by selecting an appropriate resistor $R_{ANT}$ so that the antenna 102 reaches the real part of its impedance at 50 Ohms at the antenna port only when it is in proximity to a lossy dielectric body (e.g., a human body, animal body, or the like).

In such embodiments, the controller 204 may determine a reflection coefficient ("$|S_{11}|$") from the radio frequency electromagnetic energy reflected by the antenna. This can be done by using one of the other control signals 206 to get the radio frequency transmit level or by measuring with an additional power sensor (not shown in FIG. 1 or 2) at the other coupler port 110, in order to improve accuracy. The controller 204 may then compare the determined reflection coefficient $|S_{11}|$ with a predetermined reflection coefficient for the antenna in free space, wherein deviation of the reflection coefficient $|S_{11}|$ from the predetermined reflection coefficient for the antenna in free space indicates proximity of the antenna 102 to a body. For instance, the controller may compare the reflection coefficient $|S_{11}|$ for the antenna with a predetermined threshold reflection coefficient. When the reflection coefficient $|S_{11}|$ is less than this threshold coefficient, the controller 204 may determine that the antenna 102 is in proximity to a body, and may control function of the mobile communication device 200 accordingly.

Figure 4:
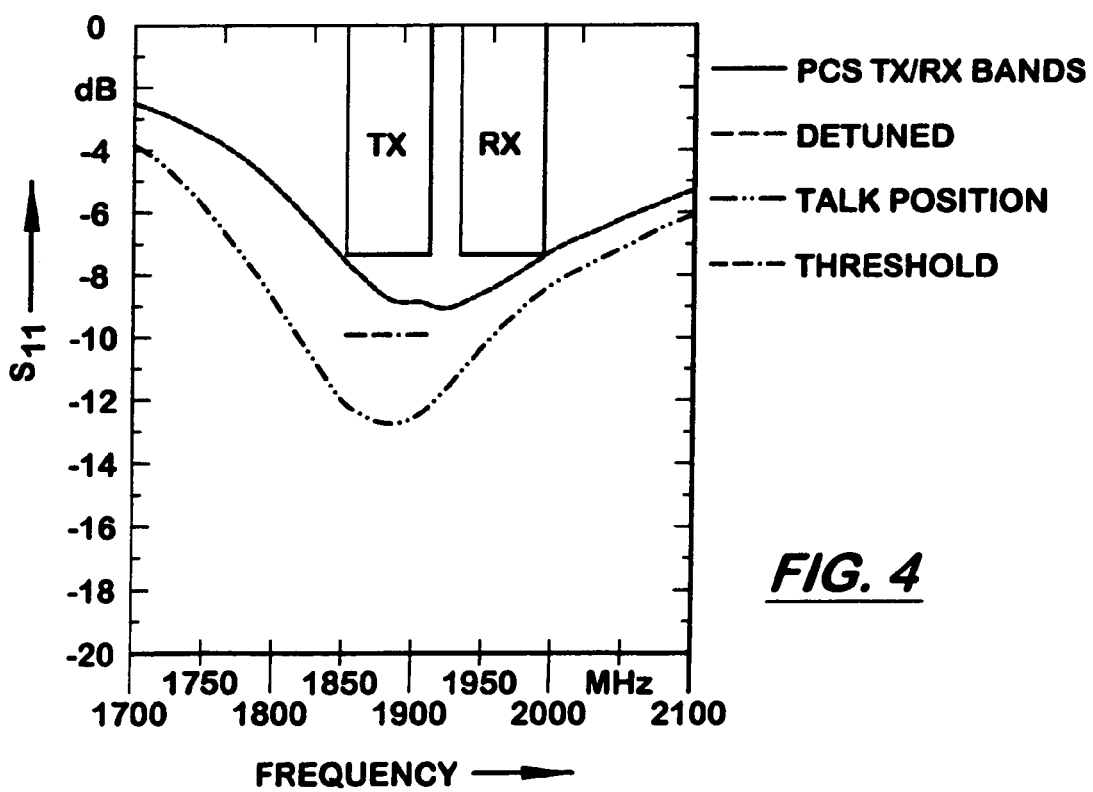
FIGS. 4 and 5 are graphs illustrating reflection coefficients $|S_{11}|$ of exemplary mobile communication device antennas for different positions of the device.

FIG. 4 illustrates reflection coefficients $|S_{11}|$ calculated for an antenna 102 used in an exemplary mobile communication device employing a PCS (Personal Communication System) air interface standard. Reflection coefficients for the detuned antenna in free space are illustrated by the curve labeled "DETUNED" while reflection coefficients for the antenna held in a talk position (i.e., a position where the device is held against the ear, cheek and mouth of a user's head) are illustrated by the curve labeled "TALK POSITION". For the antenna shown, a threshold reflection coefficient of approximately –10 dB is selected as indicated by the curve "THRESHOLD". Thus, when the reflection coefficient $|S_{11}|$ for the antenna is determined to be less than –10 dB, the antenna is determined to be in proximity to a body.

It will be appreciated that by detuning the antenna of a mobile communication device, the overall radio frequency (RF) performance of the device is generally degraded. However, it has been found that, depending on the accuracy of the power sensor and antenna parameter tolerances used, the antenna 102 of an exemplary mobile communication device 200 employing a PCS air interface may be detuned so that the antenna's reflection coefficient $|S_{11}|$ is in the range of –7.5 dB instead of –12 dB (see FIG. 4) with reduced performance of as little as approximately 0.6 dB. Such reduced performance approaches the minimum limit of degradation that can be measured for radiated emission, and is thus almost negligible in practical applications. Consequently, the antenna 102 of a mobile communication device 200 may be detuned sufficiently for use by the present invention with little impact on the performance of the device.

Figure 5:
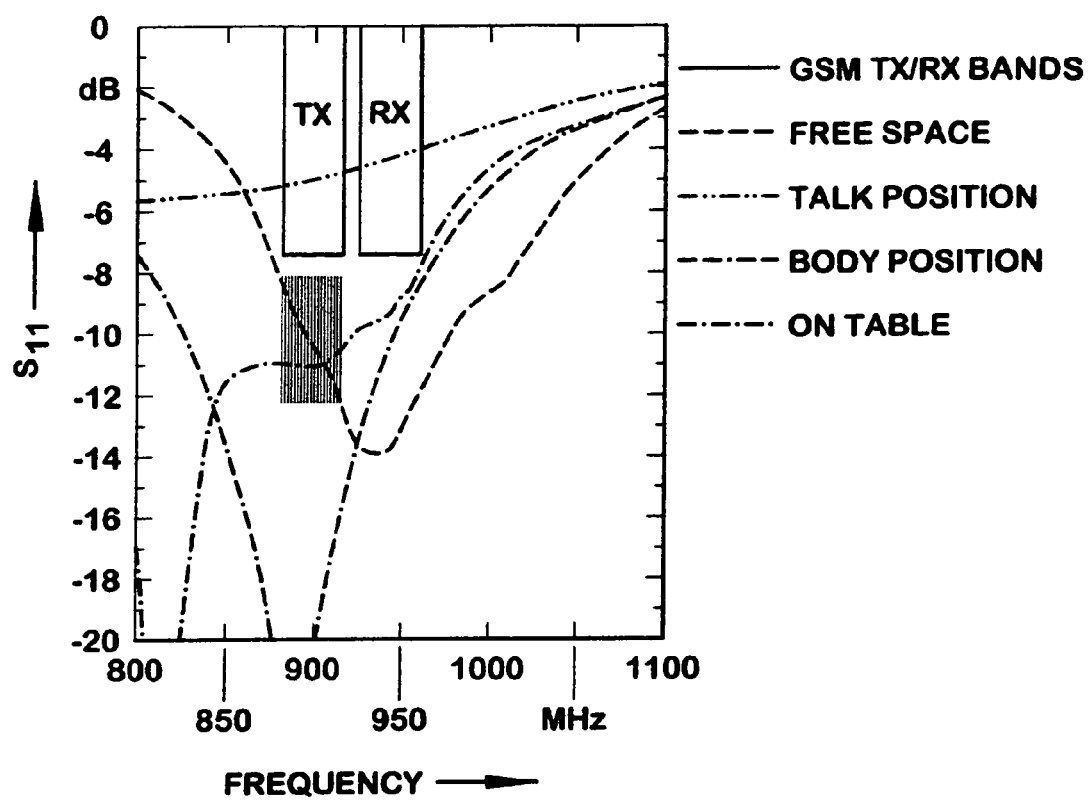

Alternately, a range of reflection coefficients $|S_{11}|$ within the transmit band (Tx) of the mobile communication device 200 may be determined where the antenna 102 is not in proximity to a human body. This range of reflection coefficients $|S_{11}|$ is bounded by a lower threshold reflection coefficient $|S_{11}|$ and an upper threshold reflection coefficient $|S_{11}|$. For example, in FIG. 5, reflection coefficients $|S_{11}|$ are calculated for an antenna of an exemplary mobile communication device for different positions of the device (i.e., in free space, held in a talk position, held in a body position, and lying on a table). As shown in FIG. 5, the range of reflection coefficients $|S_{11}|$ for the mobile communication device where the antenna may be safely assumed to be not in proximity to a human body (indicated by the shaded region) is bounded by a lower threshold reflection coefficient $|S_{11}|$ of –12 dB and an upper threshold reflection coefficient $|S_{11}|$ of –8 dB. A determined reflection coefficient $|S_{11}|$ falling within this range indicates that no human body is in proximity to the communication device, while any determined reflection coefficient $|S_{11}|$ falling outside of this range indicates that a human body may be in proximity to the device.

It is contemplated that the antenna 102 of a typical electronic device such as mobile communication device 200 (FIG. 2) will be sensed to be in proximity to a human body when it has been raised to a talk position by the user (i.e., wherein the device is held against the ear, cheek and mouth of the user's head) and when it is in contact with or is immediately adjacent to the human body (e.g., is held in a body position wherein the device 100 is resting in the user's lap, is attached to the user's belt, is contained within a pocket of the user's clothing, or the like). However, it will be appreciated that the distance the mobile communication device 200 must be held away from the human body to prevent unwanted exposure of the body to radiation will depend on the power and frequency of the device, and may vary depending on specific design requirements of the device and the air interface standard utilized. Thus, the distance at which the mobile communication device 200 is considered to be in proximity of a human body when not in contact with or immediately adjacent to the body whereupon the human body proximity signal 116 is generated may vary accordingly.

Because system 100 of the present invention detects a body by measuring radio frequency energy reflected by an antenna, it may be capable of reliably sensing the proximity of a human body regardless of orientation of electronic device (e.g., mobile communication device 200) in which it is used. For instance, the present invention allows proximity of an electronic device such as mobile communication device 200 to a body to be determined not only when the device is placed in a "talk" position, but also when the device is placed in the user's lap, or is placed in a pocket of the user's clothing. Moreover, by utilizing existing components (e.g., the antenna and controller) of an existing device (e.g., mobile communication device 200), integration of the system 100 of the present invention with the other components of the device is simplified.

Figure 6:
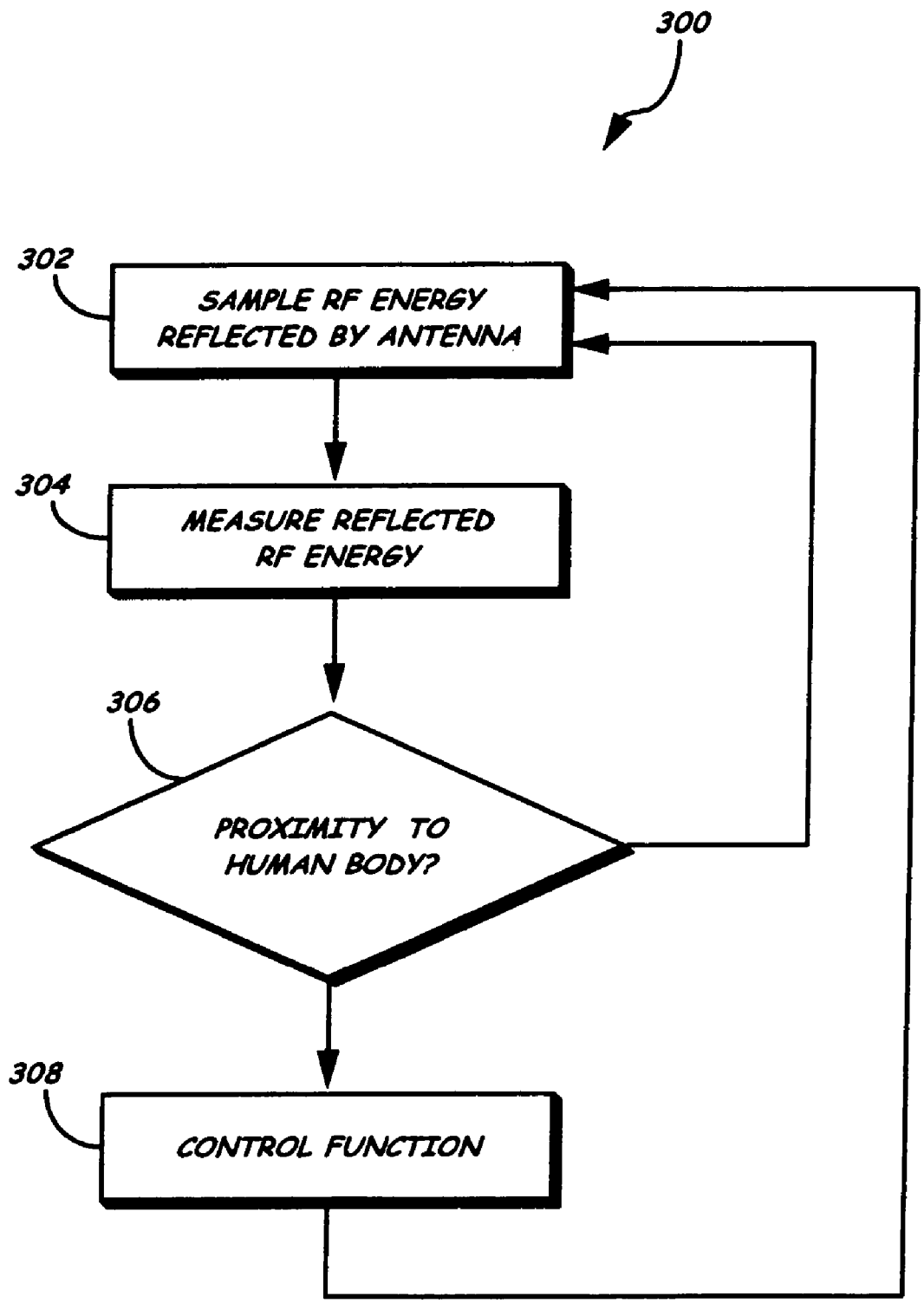
FIG. 6 is a flow diagram illustrating an exemplary method for sensing proximity of a body in accordance with an exemplary embodiment of the present invention.

Referring now to FIG. 6, a method 300 for sensing the proximity of a body is described. In the exemplary embodiment shown, upon radio frequency transmission by the device, radio frequency electromagnetic energy reflected by an antenna is sampled, for example, by a sensor assembly such as sensor assembly 112 (FIG. 2), at step 302. The reflected energy is then measured at step 304, and a determination made whether the mobile communication device is in proximity to the human body, at step 306. The result of this determination may then be utilized to control operation of an electronic device using the method, at step 308.

In exemplary embodiments of the invention, a reflection coefficient $|S_{11}|$ is calculated from the reflected radio frequency electromagnetic energy (see FIGS. 4 and 5). A determination may then be made whether this reflection coefficient $|S_{11}|$ deviates from a predetermined reflection for the antenna in free space, such deviation indicating proximity to a body. For instance, in one embodiment, the antenna is detuned when no body is present. Proximity of the antenna to a human body is determined to exist when the calculated reflection coefficient $|S_{11}|$ falls below a predetermined threshold reflection coefficient (See FIG. 4). Alternately, the antenna is not detuned. A range of reflection coefficients $|S_{11}|$ where the mobile communication device is not in proximity to a body is defined for the antenna within a transmit band (Tx) of the electronic device in which the antenna is used. This range is bounded by a lower threshold reflection coefficient and an upper threshold reflection coefficient. In this manner, the antenna is ascertained to be not in proximity to the body when the determined reflection coefficient $|S_{11}|$ for the antenna is greater than the lower threshold reflection coefficient and less than the upper threshold reflection coefficient. All other determined reflection coefficients $|S_{11}|$ may be viewed as indicating that the antenna is in proximity to the body.

Although the invention has been described with a certain degree of particularity, it should be recognized that elements thereof may be altered by persons skilled in the art without departing from the scope and spirit of the invention. It is understood that the specific order or hierarchy of steps in the method 300 illustrated in FIG. 6 is an example of an exemplary approach. Based upon design preferences, it is understood that the specific order or hierarchy of this method can be rearranged while remaining within the scope of the present invention. The accompanying method claims present elements of the various steps of method 300 in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for detecting the proximity of a body using an antenna capable of having its impedance altered for changing the amount of radio frequency electromagnetic energy provided to the antenna via an antenna feed and reflected onto the antenna feed when the antenna is in proximity to the body, the method comprising steps of:

sampling radio frequency electromagnetic energy reflected by the antenna within a predetermined frequency band;

measuring the sampled radio frequency electromagnetic energy;

determining proximity of the antenna to the body based on the amount of radio frequency electromagnetic energy measured, wherein determining proximity of the antenna to the body comprises calculating a reflection coefficient from the radio frequency electromannetic energy reflected by the antenna, the determined reflection coefficient deviating from a predetermined reflection coefficient for the antenna in free space when the antenna is in proximity to the body.

2. The method as claimed in claim 1, wherein measuring the sampled radio frequency electromagnetic energy comprises measuring the power of the radio frequency electromagnetic energy reflected by the antenna, the power of the radio frequency electromagnetic energy reflected by the antenna being decreased when the antenna is in proximity to the body.

3. The method as claimed in claim 1, wherein the antenna is detuned when it is not in proximity to the body.

4. The method as claimed in claim 3, wherein determining proximity of the antenna to the body further comprises comparing the calculated reflection with a threshold reflection coefficient, the antenna being in proximity to the body when the reflection coefficient is less than the threshold coefficient.

5. The method as claimed in claim 1, wherein determining proximity of the antenna to the body further comprises comparing the reflection coefficient with a lower threshold reflection coefficient and an upper threshold reflection, the reflection coefficient being one of greater than the lower threshold reflection coefficient and less than the upper threshold reflection coefficient when the antenna is not in proximity to the body.

6. The method as claimed in claim 3, wherein the antenna becomes tuned when in proximity to the body.

7. The method as claimed in claim 6, wherein the system comprises a mobile telephone or a mobile palmtop computing device or a mobile laptop computer.

8. The method as claimed in claim 1, further comprising controlling a function of a system when the antenna is determined to be in proximity to the body.

9. The method as claimed in claim 8, wherein the step of controlling said function comprises reducing power, issuing a warning regarding an unsuitable power level, or lowering a ringer volume, or any combination thereof.

10. The method as claimed in claim 9, wherein said step of controlling said function of the system is also based on a current traffic mode and/or a current power level needed for maintaining the wireless communication link of the system.

* * * * *